(12) United States Patent
Oboodi et al.

(10) Patent No.: US 7,475,607 B2
(45) Date of Patent: Jan. 13, 2009

(54) SENSING APPARATUS WITH AN INTEGRATED GASKET ON A BEAM COMPONENT

(75) Inventors: Reza Oboodi, Morris Plains, NJ (US); James Piascik, Randolph, NJ (US); Michael C. Janosik, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 120 days.

(21) Appl. No.: 10/925,587

(22) Filed: Aug. 25, 2004

(65) Prior Publication Data

US 2005/0150305 A1 Jul. 14, 2005

Related U.S. Application Data

(60) Provisional application No. 60/534,707, filed on Jan. 8, 2004.

(51) Int. Cl.
*G01L 1/04* (2006.01)

(52) U.S. Cl. .................................. 73/862.639

(58) Field of Classification Search ............ 73/862.639, 73/774
See application file for complete search history.

(56) References Cited

U.S. PATENT DOCUMENTS

| | | | | |
|---|---|---|---|---|
| 4,023,562 A | | 5/1977 | Hynecek et al. | |
| 4,107,626 A | * | 8/1978 | Kiewit | 331/65 |
| 4,340,083 A | * | 7/1982 | Cummins | 137/499 |
| 4,450,375 A | * | 5/1984 | Siegal | 310/331 |
| 4,790,192 A | * | 12/1988 | Knecht et al. | 73/721 |
| 4,793,194 A | * | 12/1988 | Wilner | 73/862.628 |
| 4,794,048 A | | 12/1988 | Oboodi et al. | |
| 5,331,857 A | * | 7/1994 | Levine et al. | 73/756 |
| 5,551,294 A | | 9/1996 | Hermann | |
| 5,729,077 A | * | 3/1998 | Newnham et al. | 310/328 |
| 5,834,646 A | * | 11/1998 | Kvisteroy et al. | 73/514.29 |
| 6,308,723 B1 | * | 10/2001 | Louis et al. | 137/1 |
| 2002/0066312 A1 | | 6/2002 | Lebrun et al. | |
| 2004/0221896 A1 | * | 11/2004 | Ballenger et al. | 137/554 |
| 2005/0064581 A1 | * | 3/2005 | Manalis et al. | 435/287.2 |
| 2006/0107752 A1 | * | 5/2006 | Kotovsky | 73/777 |

FOREIGN PATENT DOCUMENTS

DE 43 01 278 A1 7/1994

* cited by examiner

*Primary Examiner*—Edward Lefkowitz
*Assistant Examiner*—Octavia Davis
(74) *Attorney, Agent, or Firm*—Ingrassia Fisher & Lorenz, P.C.

(57) ABSTRACT

A sensing apparatus comprises a sensing beam having piezo-resistive components mounted therein that output a signal as a function of a strain on the sensing beam and a main body holding the sensing beam. The sensing beam includes a gasket pattern integrated thereon to create a substantially uniform interface between the main body and the clamp.

13 Claims, 3 Drawing Sheets

SENSING APPARATUS WITH AN INTEGRATED GASKET ON A BEAM COMPONENT

CROSS-REFERENCE TO RELATED APPLICATION

This application claims priority under 35 U.S.C. § 119(e) of U.S. Provisional Application No. 60/534,707 filed on Jan. 8, 2004, the entire contents of which are incorporated by reference herein.

FIELD OF THE INVENTION

The present invention relates to a sensing apparatus, such as for use in measuring a position of a movable member, and more particularly to a sensing apparatus having an integrated gasket on a sensing beam component.

BACKGROUND OF THE RELATED ART

In fluid transfer and routing systems, valves are extensively used to control delivery and otherwise regulate fluid flow. Frequently, proper valve operation and fast and reliable recognition of valve failures are critical to fluid system reliability.

It is known in the art to detect valve failures by measuring characteristic parameters of the fluid being transported. However, such methods largely tend to be very elaborate and require complex testing and analysis methodologies to ensure accurate detection. Furthermore, implementing such failure detection methods tend to undesirably increase development costs, operational costs, system downtime, and, where relevant, retrofit costs.

It is also known to detect a valve failure in accordance with sensing the position of a valve and comparing the sensed valve position to an expected valve position. Conventional valve position sensors, however, such as limit switches and potentiometers, often have low reliability because of their reliance on electrical contacts, which tend to wear and deteriorate relatively quickly. Comparatively reliable sensors, such as rotary variable transformers and linear variable differential transformers, are typically expensive. Other position sensors, such as eddy current sensors, Hall effect sensors, proximity sensors, and the like typically only operate in a limited temperature range.

To address these drawbacks of conventional position sensors, a cantilever-type position sensor, which in one embodiment is based on ceramic on metal technology described in U.S. Pat. No. 4,794,048, has been developed and described in U.S. Pat. No. 6,308,723. In such a position sensor, a deflectable sensing "beam" is cantilever-mounted to a main body, via a clamping force. In one configuration, the beam includes a thin metal substrate on which piezo-resistive components, the resistance of which change when strained, are disposed and coated with and fixed by means of glass or ceramic. The inventors of this application have found that such a configuration may exhibit wide variability in performance depending on clamping materials and method of assembly, resulting in expensive and labor-intensive assembly processes with poor yield and lack of part to part consistency. The inventors of this application have found that a cause of this problem is the non-uniformity of interfaces between the clamp and ceramic/glass coating on the beam.

SUMMARY OF THE INVENTION

In one aspect, the present invention is a sensing apparatus comprising: a sensing beam having piezo-resistive components mounted therein that output a signal as a function of a strain on the sensing beam; and a main body holding the sensing beam, wherein the sensing beam includes a gasket pattern integrated thereon to create a substantially uniform interface between the main body and the sensing beam. In one implementation, the sensing apparatus is a position sensor, such as for sensing valve position in an aerospace system.

BRIEF DESCRIPTION OF THE DRAWINGS

Other aspects of the invention will become apparent from the following description taken in conjunction with the accompanying drawings, in which.

DETAILED DESCRIPTION

Embodiments of the present invention are more specifically set forth in the following description, with reference to the appended drawings. In the following description and accompanying drawings, like elements are denoted with similar reference numbers. Further, well-known elements and related explanations are omitted so as not to obscure the inventive concepts presented herein.

Figure 1:
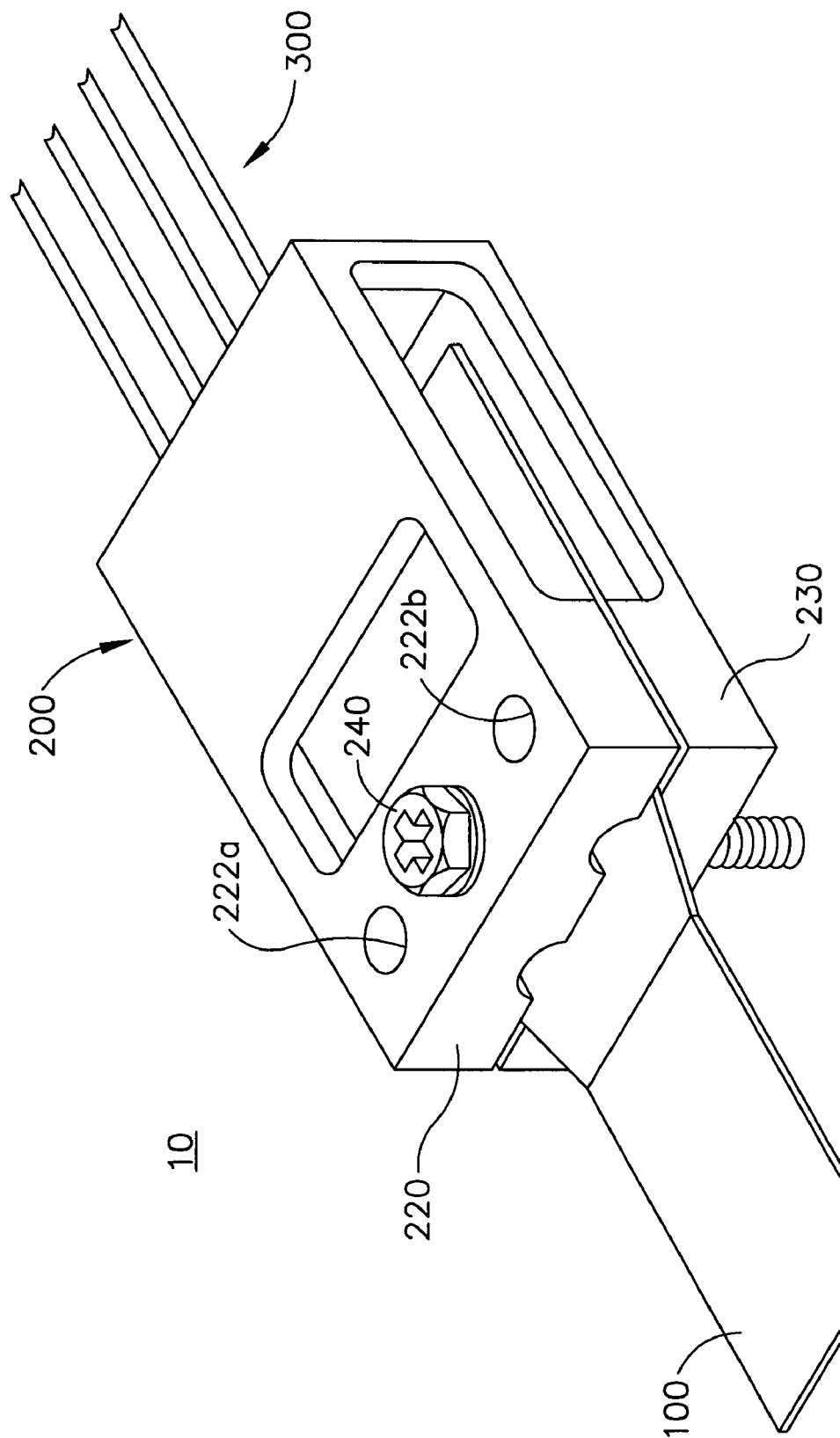
FIG. 1 is a perspective view of a sensing apparatus according to an embodiment of the present invention.

FIG. 1 shows a sensing apparatus 10 according to an embodiment of the present invention. As seen in FIG. 1, sensing apparatus 10 includes a sensing beam 100 and a clamp 200. The clamp 200 includes an upper portion 220 and a lower portion 230, between which the sensing beam 100 is held. In this way, the clamp 200 is a main body or housing of the sensing apparatus 10. In the embodiment of FIG. 1, the clamp upper portion 220 and the clamp lower portion 230 apply securing force to the sensing beam 100, e.g., by tightening a central screw 240 inserted via threaded holes (not shown) in the clamp upper portion 220 and the clamp lower portion 230. The sensing apparatus 10 may be mounted for operation via the central screw 240. The sensing apparatus 10 further includes alignment holes 222a, 222b, which receive alignment pins (not shown) for positioning the sensor for application. The sensing beam 100 is electrically connected to an external device, such as a computer, via lead wires 300 to receive electrical power and output electrical signals representing resistance changes of the piezo-resistive components mounted thereon. As will described in detail below, an implementation of the present invention incorporates a gasket pattern integrated on the sensing beam 100 to create a uniform interface between the coating on the sensing beam 100 and the clamp 200.

Oboodi, U.S. Pat. No. 4,794,048 ("'048 patent"), which issued on Dec. 27, 1988, is hereby incorporated by reference in its entirety. This patent discloses a ceramic coated metal substrate for use in electronic applications. Louis et al., U.S. Pat. No. 6,308,723 ("'723 patent"), which issued on Oct. 30, 2001, is also hereby incorporated by reference in its entirety. This patent discloses position sensing embodiments utilizing a sensing beam incorporating piezo-resistive components that, when strained, create output signals that are used to calculate valve position. One particular embodiment of the '723 patent to which principles of the present application may be applied is described below.

Figure 2:
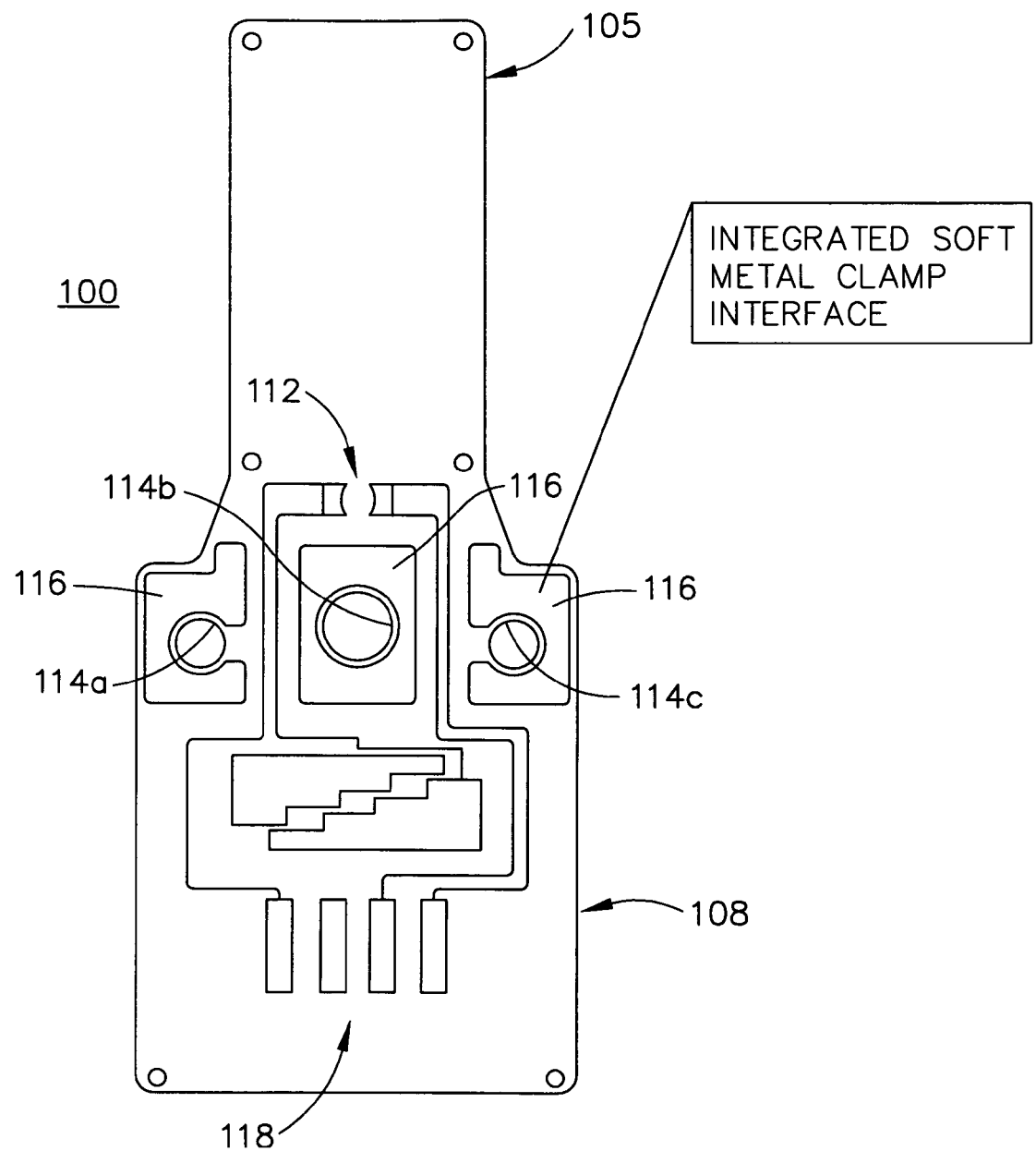
FIG. 2 is a top plan view of a sensing beam of the sensing apparatus shown in FIG. 1 according to an embodiment of the present invention.

FIG. 2 is a top plan view of sensing beam 100 according to an embodiment of the present invention. As seen in FIG. 2, the sensing beam 100 includes a first sensing beam portion 105, which extends from the clamp 200, and a second sensing beam portion 108 that is fixed within the clamp 200. As such, the sensing beam 100 is cantilever-mounted with respect to the clamp 200, so that the second sensing beam portion 108 is fixed relative to the clamp 200 and the first sensing beam portion 105 is free to resiliently deflect from a neutral position. The sensing beam 100 shown in FIG. 2 further includes: piezo-resistive components 112; through-holes 114a, 114c for alignment pins extending between the upper clamp portion 220 and the lower clamp portion 230 and through-hole 114b for the central screw 240 extending between the upper clamp portion 220 and the lower clamp portion 230; gasket regions 116, proximate to through-holes 114a-c; and an electrical lead arrangement 118, for electrical connection to an external device via lead wires 300.

In a preferred embodiment, the sensing beam 100 is formed as a metal substrate with a ceramic coating. Depending on operating conditions, such as temperature, other materials may be used. The sensing beam 100 has mechanical characteristics that permit resilient deflection from a neutral position and return to the neutral position.

Figure 3:
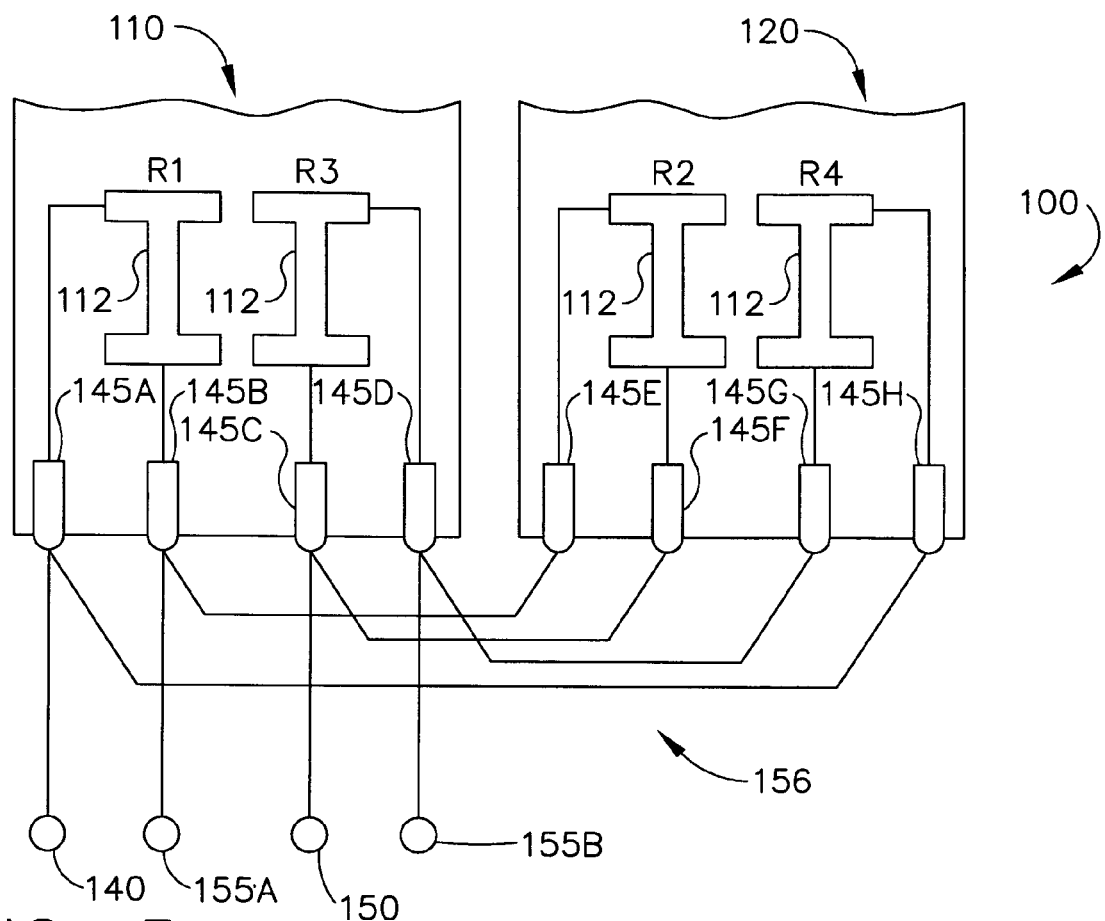
FIG. 3 is a partial split plan depiction of the top and bottom surfaces of a sensing beam incorporating a piezo-resistive arrangement according to an embodiment of the present invention.
Figure 4:
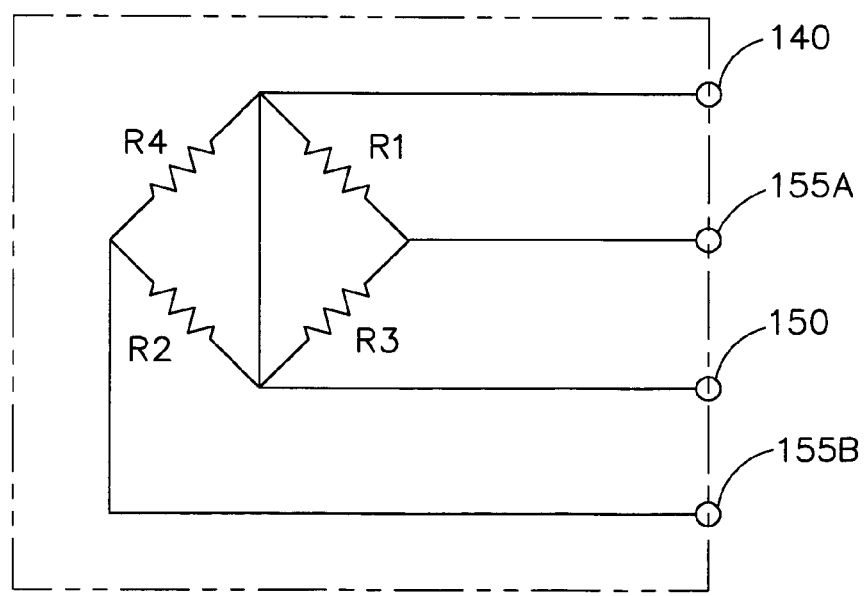
FIG. 4 is an electrical schematic depiction of a piezo-resistive Wheatstone bridge incorporated by a sensing beam according to an embodiment of the present invention.

With reference to attached FIGS. 3,4, disposed upon sensing beam 100 are piezo-resistive components 112, the resistance of which change when strained, that in a preferred embodiment are coated with and fixed by means of glass or ceramic. The advantages of constructing sensing beam 100 in this manner are described in detail in the '048 patent. For example, the ceramics/glasses used in the disclosed embodiments have a high temperature refiring capability and are air firable. Moreover, the disclosed sensing beam 100 exhibits a composite thermal coefficient of expansion which is desirable for use in electronic devices, and exhibits a low dielectric constant which allows for use with high frequency circuits and allows for greater applicability in electronic applications. Furthermore, the ceramics/glasses used in this sensor design exhibit strong adhesion to the metal substrate after firing and are very resistant to thermal stress. This avoids breakdown of sensing beam 100 when exposed to high temperatures normally encountered in engine environments and/or the operation of electronic devices. Sensing beam 100 electrically communicates an output signal through lead wires 300 to a computer or other display or read device (not shown).

In one embodiment, the arrangement of piezo-resistive components 112 incorporated by sensing beam 100 is such as to form a Wheatstone bridge, although other similarly functioning circuit configurations may be substituted. As shown in FIGS. 3 and 4, the Wheatstone bridge comprises an input 140, a ground 150, a pair of outputs 155A, 155B, eight terminals 145A, 145B, 145C, 145D, 145E, 145F, 145G, 145H, and four piezo-resistors R1, R2, R3, R4. As best illustrated by FIG. 3, piezo-resistors R1, R3 and terminals 145A, 145B, 145C, 145D are situated on a top surface 110 of sensing beam 100 and piezo-resistors R2, R4 and terminals 145E, 145F, 145G, 145H are situated on a bottom surface 120 of sensing beam 100. Through the use of a connector means 156, terminal 145A is electrically connected to terminal 145H, terminal 145B is electrically connected to terminal 145E, terminal 145C is electrically connected to terminal 145F, and terminal 145D is electrically connected to terminal 145G. Connector means 156 may be standard electrical wiring or any other similarly functioning device known in the art.

A continuous supply of input voltage from a voltage supply may be supplied to sensing beam 100 through the clamp 200 via input 140 and returns to outputs 155A, 155B as an output voltage or signal. The value of this output signal is a function of the effective resistance of sensing beam 100 created by the Wheatstone bridge. Because sensing beam 100 is fixed by clamp 200, sensing beam 100 behaves as a cantilever beam such that when the first sensing beam portion 105 is bent or otherwise deflected, e.g., by a valve member, piezo-resistors R1, R2, R3, R4 are strained resulting in a change in the effective resistance of sensing beam 100.

An embodiment of the present invention integrates an interface material between the inorganic (e.g., glass/ceramic) coating on the sensing beam 100 and the clamp material to provide a uniform clamping force on the beam. This results in a consistent and predictable sensor performance, ease of assembly, and renders the sensors interchangeable. More specifically, with reference to FIG. 2, a soft metal pattern 116 is deposited on the sensing beam 100, corresponding to the footprint of the clamp 200. This creates an integrated gasket on the sensing beam 100, which accommodates any irregularities on the clamp/beam surfaces. This approach produces sensor assemblies with greater output, high linearity and constant performance, critical to sensor interchangeability. In one embodiment, the soft metal pattern 116 is deposited on both the upper and lower sides of the sensing beam 100.

The soft metal gasket pattern 116, such as AuPt, may be applied using screen-printing during the normal beam fabrication process (little or no additional labor) while its thickness and positional accuracy are determined by the screen printing process (e.g., 2 micron thickness variation/under 0.001" positional accuracy). The result is a metal conformal layer with greatly improved thermal and positional properties at virtually no cost. Other ductile/malleable metals besides AuPt may used to form the soft metal gasket, such as other Au, Pt alloys, as well as Si, Cu, and Ni alloys. Also, other fabricating techniques besides screen printing may be used to create the soft metal gasket, such as sputtering and plating. The soft metal gasket may have a thickness ranging, for example, from a few microns to tens of microns.

An implementation of the present invention provides a lower cost sensor assembly with more predictability and part-to-part interchangeability. One application of such a sensor is a position sensor for a bleed-air valve. The same principles can be used for packaging various position and pressure sensors critical to aerospace applications.

For example, principles of the present invention may be applied to a device such as the self-compensating position sensor described in U.S. patent application Ser. No. 09/727,737, filed Dec. 1, 2000, which is hereby incorporated by reference.

We claim:

1. A sensing apparatus comprising:
   a sensing beam having piezo-resistive components mounted thereon that output a signal as a function of a strain on the sensing beam; and a clamp including an upper portion and a lower portion, said sensing beam being disposed between said upper and lower portions of said clamp,
wherein said sensing beam includes a gasket pattern integrated on both an upper side and a lower side thereof to create a substantially uniform interface between said upper and lower portions of said clamp and said sensing beam.

2. The sensing apparatus according to claim 1, wherein said sensing beam is cantilever-mounted relative to said main body, such that one portion of said sensing beam is fixed with respect to said main body and a second portion of said sensing beam is deflectable.

3. The sensing apparatus according to claim 2, wherein said piezo-resistive components output a signal representing deflection of a second portion of said sensing beam from a neutral position.

4. The sensing apparatus according to claim 3, wherein the amount said second portion of said sensing beam deflects from the neutral position represents position of a movable member.

5. The sensing apparatus according to claim 4, wherein said movable member is a valve.

6. The sensing apparatus according to claim 1, wherein said sensing beam comprises a metal substrate on which said piezo-resistive components are mounted and glass or ceramic coating said piezo-resistive components.

7. The sensing apparatus according to claim 1, wherein said gasket pattern is formed of a soft metal.

8. The sensing apparatus according to claim 7, wherein said metal is an Au, Pt, Si, Cu, or Ni alloy.

9. The sensing apparatus according to claim 8, wherein said metal is AuPt.

10. The sensing apparatus according to claim 1, wherein said sensing beam includes piezo-resistive components on both an upper surface and a lower surface.

11. The sensing apparatus according to claim 10, wherein said piezo-resistive components form a Wheatstone bridge.

12. The sensing apparatus according to claim 1, wherein said sensing apparatus is a position sensor.

13. The sensing apparatus according to claim 1, wherein said sensing apparatus is a valve position sensor for an aerospace system.

* * * * *